3,233,920
INSULATED PIPE JOINT
Paul R. Ammann, Decatur, Ill., assignor to Mueller Co., Decatur, Ill., a corporation of Illinois
Filed Feb. 27, 1963, Ser. No. 261,278
4 Claims. (Cl. 285—54)

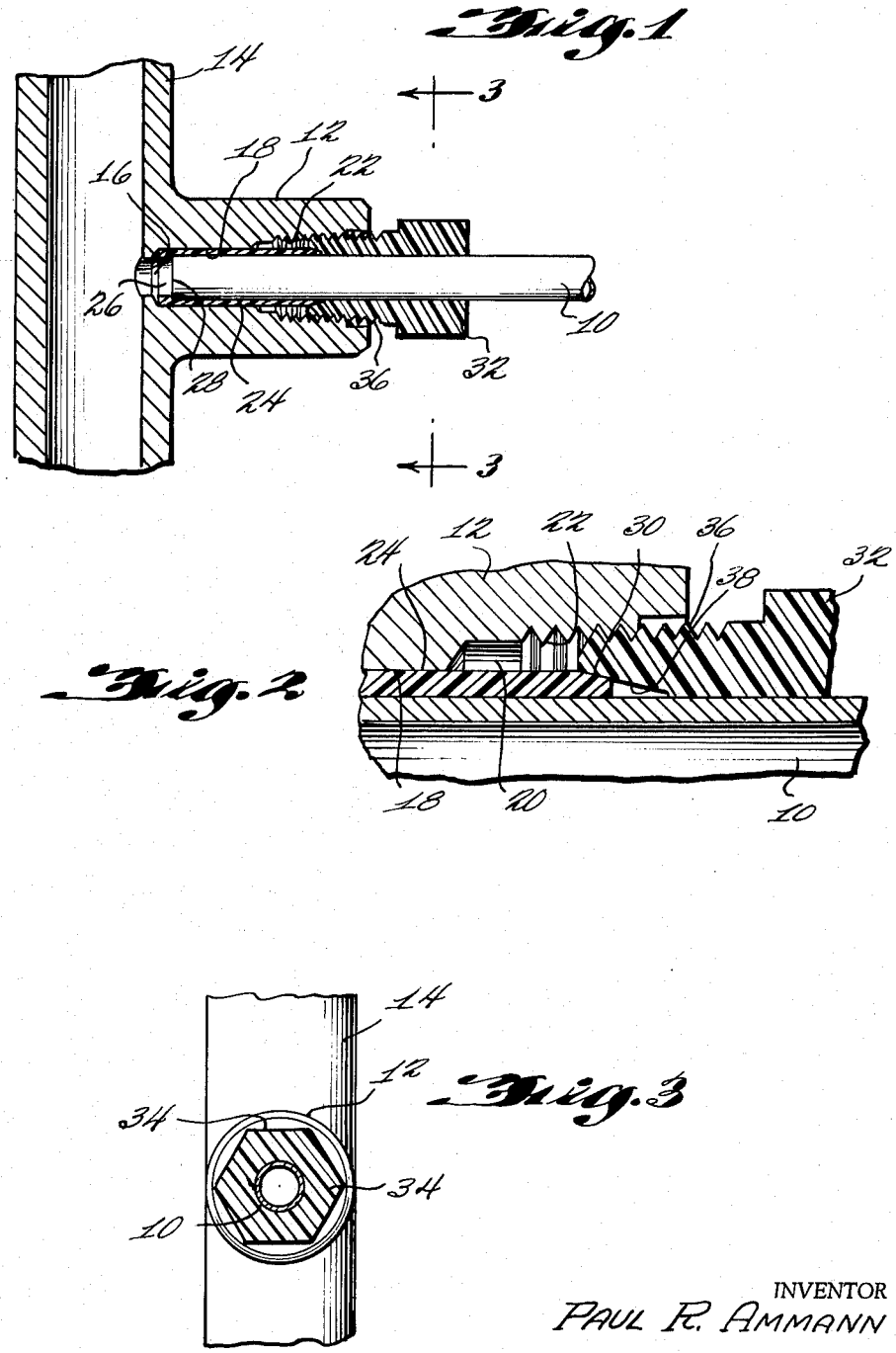

This invention relates to a new and improved joint or coupling for connecting metal conduits to one another in sealed and electrically insulated relationship. More especially this invention pertains to an improved electrically insulating joint of particular utility in connecting thin-walled metal pipe, such as copper tubing, to another hollow metal body, such as a pipe, a pipe fitting, a valve body, and so forth.

Many attempts have been made in the past to provide a simple, inexpensive joint for connecting thin-walled metal pipes to each or to other metal bodies that not only will electrically insulate the two coupled metal members from each other, but also will provide an efficient seal against leakage while at the same time retaining adequate tensile or pull-out strength. While joints of this nature which provide effective electrical insulation, tensile strength, and fluid tightness have been developed, in the main such joints have been relatively expensive, difficult to assemble, or possess other disadvantages. The problem is complicated by the fact that thin-walled pipe cannot be provided with threads of adequate strength so that the joint usually is of the so-called compression type wherein tensile strength is obtained only by frictional engagement.

Accordingly, it is an object of this invention to provide an improved compression joint for connecting thin-walled metal pipes and conduits to each other or to other hollow bodies which provides effective electrical insulation between the coupled parts while retaining tightness against fluid leakage and adequate tensile strength.

It is another object of this invention to provide an improved pipe joint of the type under consideration which is extremely simple in construction and consequently effects economies in manufacture coupled with additional savings in time and labor in making up the joint.

These and other objects and advantages of the invention will become apparent from the following description and accompanying drawings, in which:

FIGURE 1 is a longitudinal sectional view of an insulated joint embodying this invention;

FIGURE 2 is an enlarged fragmentary view of a portion of FIGURE 1; and

FIGURE 3 is a sectional view taken along line 3—3 of FIGURE 1.

Referring now to the drawings there is shown a preferred embodiment of a joint embodying this invention. The joint is illustrated by the connection of a copper tube 10 to the terminal portion of a hollow body in the form of a tubular boss 12 constituting a lateral branch of a metal conduit 14. It will be realized, however, that the invention is equally applicable to connecting other smooth-surfaced thin-walled metal pipes to the terminal portion of any hollow metal body, e.g., a pipe, a valve, a pipe fitting, etc. The terminal portion or outer end of the boss 12 is interiorly enlarged to provide an annular packing recess terminating at its inner end in an outwardly facing circumferential shoulder 16 constituting an annular abutment. Adjacent the shoulder 16 and extending outwardly therefrom the packing recess is provided with a smooth-walled cylindrical section 18, while outwardly beyond such section the recess is provided with an enlarged section 20 having interior threads 22 which taper inwardly from the outer end of the boss 12.

Disposed within the packing recess and seated against the shoulder 16 at the inner end thereof is a cylindrical yielding packing and insulating sleeve 24, preferably made of nylon or a plastic having similar electrically insulating and sealing or packing characteristics. The sleeve 24, which is somewhat longer than the inner section 18 of the recess, has an interiorly reduced section 26 at its inner end to provide an outwardly facing shoulder 28 constituting an annular abutment. The interior diameter of the sleeve 24, outwardly of the shoulder 28, is such as to snugly receive the copper tube 10 which, as shown in FIGURE 1 of the drawings, is seated against the shoulder 28. The outer end of the sleeve 24 is provided with an exterior bevel or taper 30, best shown in FIGURE 2, for reasons later explained, such bevel being located within the enlarged threaded section 20 of the recess when the joint is made up.

Snugly engaged with the tube 10 outwardly beyond the outer end of the sleeve 24 is a gland nut 32 also made of yielding material having electrically insulating and packing or sealing characteristics, such as phenol formaldehyde resin, nylon (e.g. polymeric hexamethylene adipamide, or polymeric epsilon caprolactum), or a similar plastic material. The outer end of the gland nut 32 is provided with a non-circular, e.g. hexagonal, and preferably exteriorly enlarged section 34, as shown best in FIGURE 3, for engagement by an appropriate wrench (not shown). The inner end of the gland 32 is provided with exterior tapering threads 36 complementary to the threads 22 in the packing recess and also with an interior bevelled or tapered section 38 substantially complementary to the bevel or taper 30 on the outer end of the sleeve and engageable therewith, as shown best in FIGURE 2.

In order to assemble the joint, the gland 32 is first slipped over the end of the tube 10, and the sleeve 24 is then slipped over the end of the tube until the latter seats against the shoulder 28 in the sleeve, and then the tube and sleeve are pushed into the packing recess until the sleeve 24 seats on the shoulder 16 at the inner end thereof. The gland 32 is then moved into the recess and screwed into the threads 22 therein. As the gland 32 is screwed inwardly, it will be seen that its interiorly tapered section 38 will engage tightly over the bevel 30 on the outer end of the sleeve 24, and the engagement thereof will be tightened even more by the taper of the interengaged threads 22 and 36, to thus firmly constrict the outer end of the sleeve 24 into tight engagement with the tube 10 to make an effective seal therebetween. At the same time the inner end of the gland 32 will be tightly compressed between the recess threads 22 and the beveled portion 30 on the outer end of the sleeve 24 to thereby make an effective seal between the gland and the sleeve and between the gland and the wall of the recess, i.e., the threads 22 therein. It also will be seen that because of the compression effected by the inner end of the gland 32, the tube 10 will be tightly gripped against pull-out, thus effectively increasing the tensile strength of the joint, while at the same time effectively sealing the same against leakage to the exterior. For example, either the threads 22 and 36 need not be tapered; or the bevelled portions 30 and 38 eliminated, and reliance for tightness had either on bevelled portions or on tapered threads. It is preferred, however, to employ the cumulative effect of both. Additionally the inner recess section 18 may be of substantially the same diameter as the outer section 20 and the inner section of the sleeve 24 enlarged accordingly. It is only essential that there be an annular space between the outer end of the sleeve 24 and the wall or threads 22 of the recess for reception of the inner end of the gland 32.

It thus will be seen that the objects of this invention have been fully and effectively accomplished. It will be realized, however, that the specific preferred embodiment shown and described for the purpose of illustrating the principles of this invention is subject to modification without departing from such principles. Therefore, this invention includes all modifications encompassed within the spirit and scope of the following claims.

What is claimed is:

1. In an electrically insulated pipe joint the combination comprising: a hollow metal body having a terminal portion provided with a circular packing recess, said recess having an inner cylindrical section terminating at its inner end in an annular shoulder and an outer section provided with interior threads; a one-piece yielding sleeve of material having electrically insulating and gasket characteristics, an inner section complementary to and adapted to be disposed in said inner cylindrical section of said recess with the inner end of said sleeve seated against said shoulder, and an outer section adapted to extend within said recess outer section, said sleeve having a cylindrical pipe-receiving bore terminating at its inner end in an annular shoulder to form an abutment for the inner end of a smooth-surfaced metal pipe to be inserted in said sleeve, said sleeve and said recess outer sections being proportioned to provide an annular space therebetween; and a yielding gland nut of material having electrically insulating and gasket characteristics provided with exterior threads adapted to engage with said recess threads, said gland nut having an outer section adapted to snugly embrace the pipe and an inner section adapted to snugly embrace said sleeve outer section, the interior of the terminal portion of said gland nut inner section being of frusto-conoidal configuration and of a major diameter greater than the outside diameter of the terminal end of said sleeve outer section to effect wedging engagement with said sleeve outer section as said nut is screwed into said recess to thereby constrict said sleeve outer section into sealing and gripping engagement with a pipe inserted therein.

2. The structure defined in claim 1 in which the threads in the recess and on the gland nut taper inwardly of the recess.

3. The combination defined in claim 1 including in combination a length of metal pipe extending through the gland nut and into the sleeve with the inner end of said pipe seated on the shoulder at the inner end of said sleeve and the latter seated on the shoulder at the inner end of the recess, the gland nut being threadedly engaged with the recess threads and tightened so that the sleeve outer section is constricted into sealing and gripping engagement with said pipe.

4. The combination defined in claim 1 in which the terminal end of the sleeve outer section is of frusto-conoidal configuration generally complementary to the configuration of the interior of the terminal portion of the nut inner section.

References Cited by the Examiner
UNITED STATES PATENTS

| | | | |
|---|---|---|---|
| 625,155 | 5/1899 | Dresser | 285—53 |
| 634,448 | 10/1899 | Courson | 285—54 |
| 1,296,103 | 3/1919 | Muehlberg | 285—250 |
| 1,844,409 | 2/1932 | Rypinski | 285—356 X |
| 2,025,382 | 12/1935 | Fletcher. | |
| 2,125,382 | 12/1935 | Fletcher. | |
| 2,755,110 | 7/1956 | Jacobs | 285—423 X |
| 2,757,943 | 8/1956 | Henderson | 285—52 |
| 2,935,339 | 5/1960 | Frederick | 285—250 X |

CARL W. TOMLIN, *Primary Examiner.*